April 15, 1958     J. S. SALYER     2,831,077
INSTANTANEOUS OR TIME DELAY MERCURY SWITCH
Filed July 19, 1957
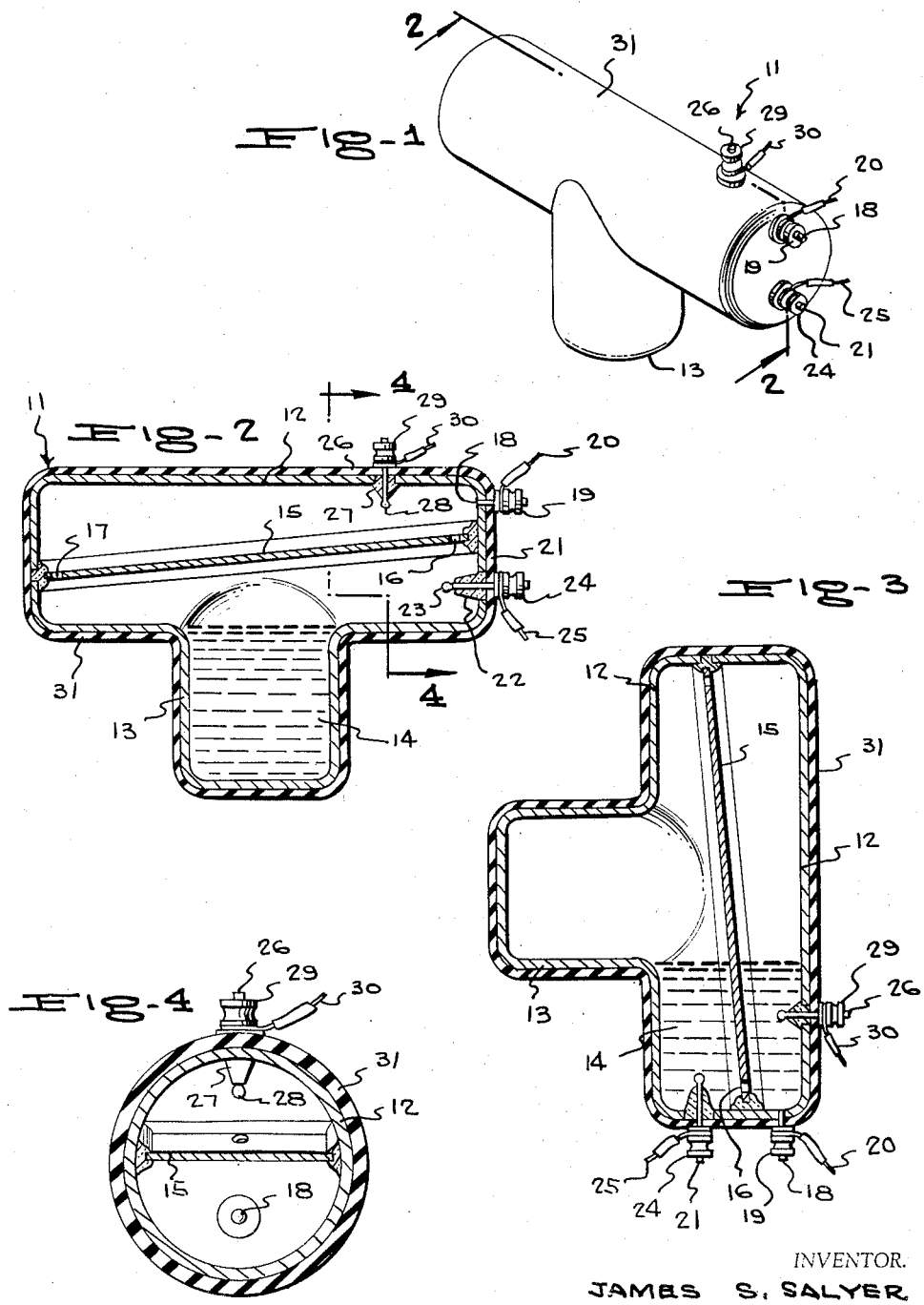
INVENTOR.
JAMES S. SALYER
BY
McMorrow, Berman & Davidson
ATTORNEYS

United States Patent Office 2,831,077
Patented Apr. 15, 1958

2,831,077

INSTANTANEOUS OR TIME DELAY MERCURY SWITCH

James S. Salyer, Royalton, Ky.

Application July 19, 1957, Serial No. 672,956

3 Claims. (Cl. 200—33)

This invention relates to electrical switches, and more particularly to a switch of the liquid contact type.

A main object of the invention is to provide a novel and improved liquid contact switch which is simple in construction, which is compact in size, and which may be employed either to provide instantaneous contact or time delay contact, as desired.

A further object of the invention is to provide an improved mercury switch which is inexpensive to manufacture, which is durable in construction, which is easy to install, and which provides dependable operation over a long period of use.

Further objects and advantages of the invention will become apparent from the following description and claims, and from the accompanying drawings, wherein:

Figure 1 is a perspective view of an improved instantaneous or time delay mercury switch constructed in accordance with the present invention.

Figure 2 is an enlarged vertical cross sectional view taken longitudinally through the switch device on the line 2—2 of Figure 1.

Figure 3 is a cross sectional view similar to Figure 2, but showing the tubular main casing of the switch device in a vertical position.

Figure 4 is an enlarged transverse vertical cross sectional view taken on the line 4—4 of Figure 2.

Referring to the drawings, the improved mercury switch device of the present invention is designated generally at 11 and comprises a tubular main casing 12 of conductive material formed at the intermediate portion of a side wall thereof with an outwardly projecting well 13 which contains a quantity of mercury 14 when the main casing 12 is in a horizontal position, as shown in Figure 2. The quantity of mercury 14 is sufficient to substantially fill one end portion of the main casing 12 when said main casing is in a vertical position, as shown in Figure 3.

Designated at 15 is a longitudinal substantially flat partition member which is mounted in the tubular main casing 12, extending from end to end thereof, and being inclined downwardly and to the left, as viewed in Figure 2. The partition member 15 is formed at its opposite end portions with respective, relatively small apertures 16 and 17. Thus, the aperture 16 serves to allow the mercury 14 to flow from the left side of the casing 12 to the right side thereof at a restricted rate when the tubular casing 12 is in the vertical position of Figure 3. The aperture 17 allows the mercury above the partition member 15 to return to the lower portion of the casing and to the well 13 when the casing 12 is in the horizontal position thereof shown in Figure 2.

Designated at 18 is a first terminal which is connected to the conductive tubular casing 12 and which is provided externally with a suitable fastening nut 19 for clampingly securing the end of the terminal wire 20 thereto. Designated at 21 is a second terminal member which is secured in a suitable insulating bushing member 22 mounted in the wall of the casing 12 and located beneath the partition member 15 at one end of the casing, as shown in Figure 2, the terminal member 21 having an exposed tip portion 23, whereby said tip portion 23 is electrically connected immediately to the casing 12 when said casing is rotated from the horizontal position thereof of Figure 2 to the vertical position thereof shown in Figure 3. The terminal member 21 is provided with an external clamping nut 24 engaged on the threaded external portion of the terminal, similar to the clamping nut 19, whereby the end of a terminal wire 25 may be clampingly secured to the terminal member 21.

Designated at 26 is a third terminal member which is mounted in the wall of casing 12 above the partition member 15 and at a location spaced from the right end of the casing, as viewed in Figure 2, the terminal 26 being insulated from the casing by a suitable supporting bushing 27 of insulating material, as shown in Figure 2. The terminal member 26 is provided with the exposed inner tip portion 28 and is provided externally with a clamping nut 29 engaged on the threaded external end of the terminal member 26.

Terminal member 26 is adapted to be connected by the clamping nut 29 to the end of a terminal wire 30.

The conductive casing 12 and its integrally formed well portion 13 are covered by suitable coating 31 of insulating material, so that no conductive portions are exposed except the ends of the terminals 21, 18 and 26 and their associated clamping nuts.

Suitable conventional means, not shown, is provided for supporting the switch device and for rotating same from the horizontal position thereof shown in Figure 2 to the vertical position thereof shown in Figure 3, when it is desired to close the switch contacts. When instantaneous contact is desired between a pair of terminal wires, for example, the terminal wires 20 and 25, the terminals 18 and 21 of the switch device are employed, so that when the switch device is rotated from the position of Figure 2 to the position of Figure 3, the mercury 14 flows into the end portion of the switch device containing the terminal 21 and immediately makes bridging contact between the exposed tip 23 of said terminal and the conductive casing 12, whereby the circuit containing terminals 21 and 18 is immediately closed.

When a delayed switch-closing action is required, the terminals 21 and 26 may be employed or the terminals 18 and 26 may be employed. In either case, a time delay is introduced by the restricting action of the aperture 16, which prevents the mercury from rising into contact with the exposed portion 28 of terminal 26 for a predetermined time period after the casing 12 is rotated from the horizontal position of Figure 2 to the vertical position of Figure 3.

When it is desired to open the circuit, the casing 12 is rotated from the vertical position of Figure 3 to the horizontal position of Figure 2, whereby the mercury flows away from the exposed end portion 28 of terminal 26, opening the circuit at this point. The mercury returns to the lower portion of the casing 12 and to the well 13 through the drain aperture 17.

While a specific embodiment of an improved combination instantaneous and time delay liquid contact switch has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A time delay liquid contact switch comprising a tubular main casing of conductive material, a well formed on one side wall of said main casing, a quantity of conductive liquid in said main casing adapted to be contained in said well when the main casing is in a horizontal position and to substantially fill one end portion of the main casing when said main casing is in a vertical position, a longitudinal partition member in said main casing extending from end to end thereof, said partition member being formed with an aperture at each end thereof, a first terminal connected to said main casing, and a second terminal in the wall of said main casing on the side of said partition member opposite said well, located in said one end portion of the casing and being insulated from said main casing, said second terminal having its inner end portion exposed to the interior of the main casing and being located below the final surface level of the conductive liquid when said main casing is in said vertical position.

2. A combination instantaneous and time delay liquid contact switch comprising a tubular main casing of conductive material, a well formed on one side wall of said main casing, a quantity of conductive liquid in said main casing adapted to be contained in said well when the main casing is in a horizontal position and to substantially fill one end portion of the main casing when said main casing is in a vertical position, a longitudinal partition member in said main casing extending from end to end thereof, said partition member being formed with an aperture in each end thereof, a first terminal connected to said main casing, a second terminal in said one end portion on the side of said partition member adjacent said well and insulated from said main casing, said second terminal having its inner portion exposed to the interior of the main casing, and a third terminal in the wall of said main casing on the other side of said partition member and being insulated from said main casing, said third terminal being located below the final surface level of the conductive liquid when said main casing is in said vertical position.

3. A combination instantaneous and time delay liquid contact switch comprising a tubular main casing of conductive material, a well formed on one side wall of said main casing, a quantity of conductive liquid in said main casing adapted to be contained in said well when the main casing is in a horizontal position and to substantially fill one end portion of the main casing when said main casing is in a vertical position, a longitudinal partition member in said main casing extending from end to end thereof, said partition member being formed with an aperture at each end thereof, a first terminal connected to said main casing, a second terminal in said one end portion on the side of said partition member adjacent said well and insulated from said main casing, said second terminal having its inner portion exposed to the interior of the main casing, and a third terminal in the wall of said main casing on the other side of said partition member and being insulated from said main casing, said third terminal having its inner portion exposed to the interior of the main casing and being located below the final surface level of the conductive liquid when said main casing is in said vertical position, said partition member being inclined downwardly and away from said last-named wall when the main casing is in its horizontal position.

References Cited in the file of this patent

UNITED STATES PATENTS

| | | |
|---|---|---|
| 972,516 | De Wolf | Oct. 11, 1910 |
| 2,209,253 | Strungart | July 23, 1940 |